May 14, 1935.　　　F. KULICK ET AL　　　2,001,029
ENGINE SUPPORT FOR AUTOMOBILES
Original Filed Dec. 9, 1931　　3 Sheets-Sheet 1

INVENTORS
Frank Kulick.
Edward L. Kulick.
BY
ATTORNEY

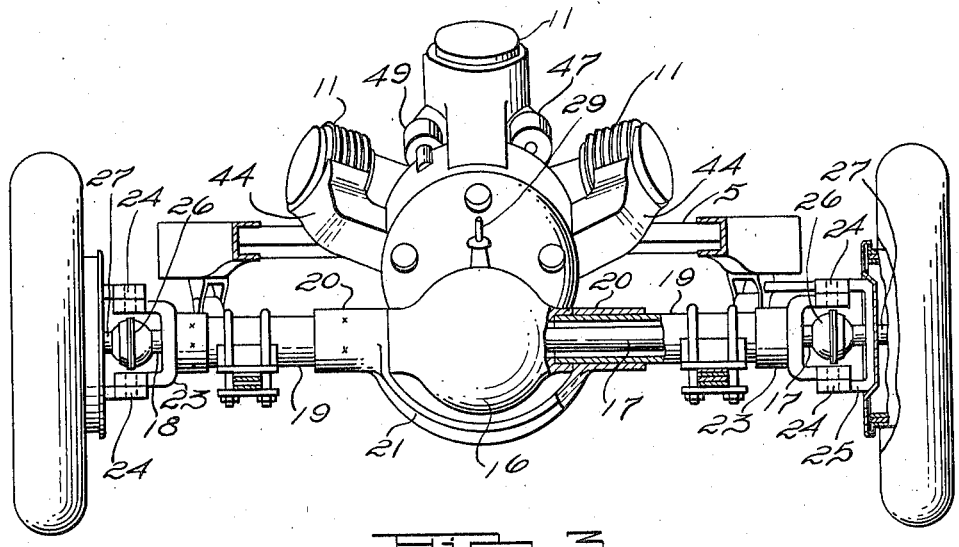
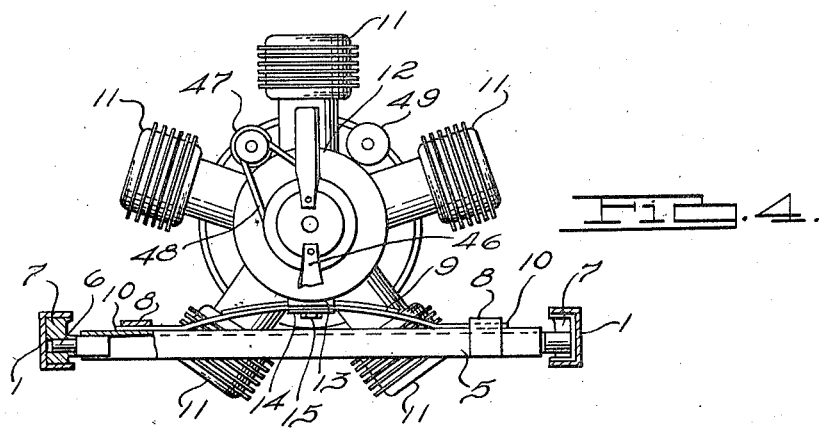
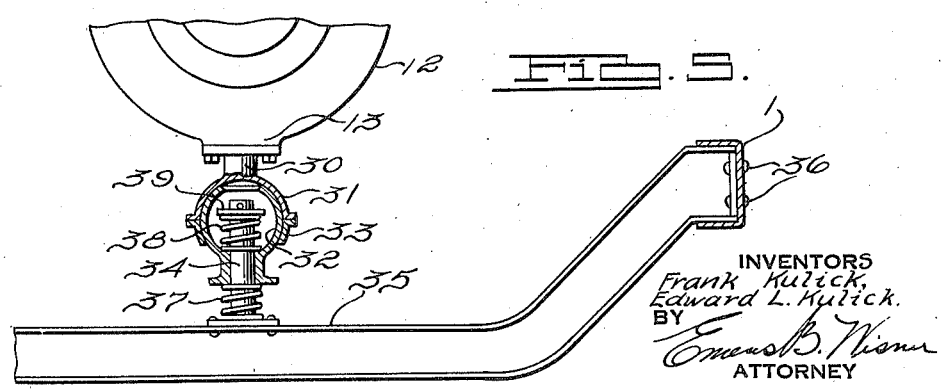

May 14, 1935.  F. KULICK ET AL  2,001,029
ENGINE SUPPORT FOR AUTOMOBILES
Original Filed Dec. 9, 1931  3 Sheets-Sheet 3
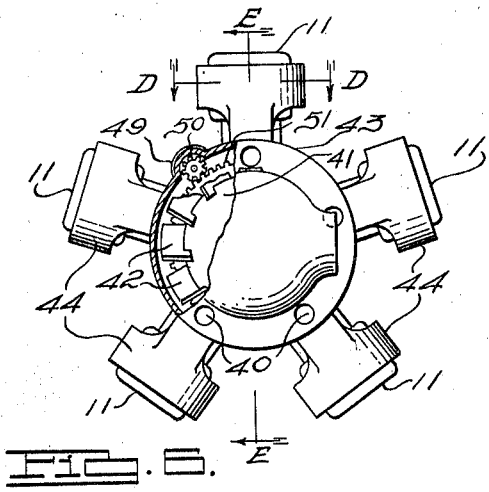
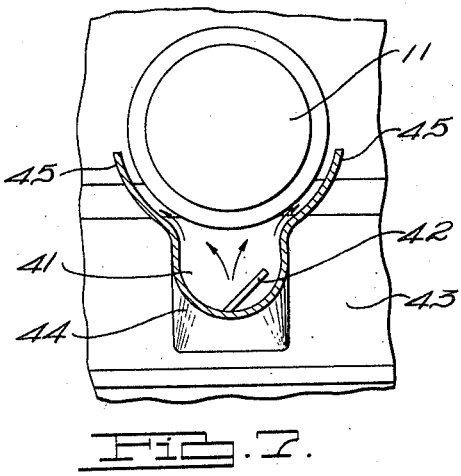
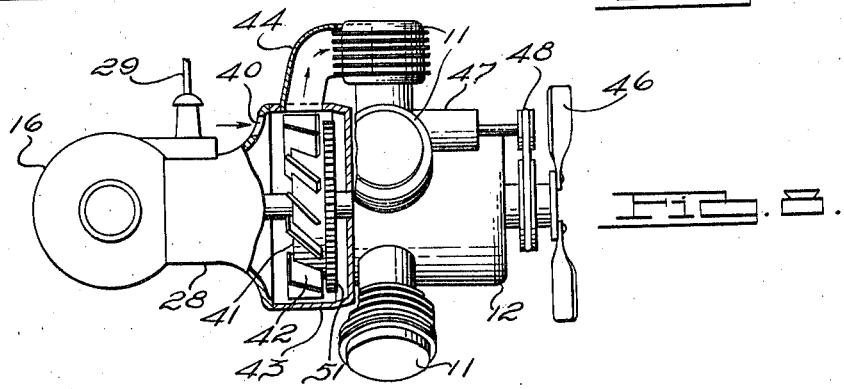
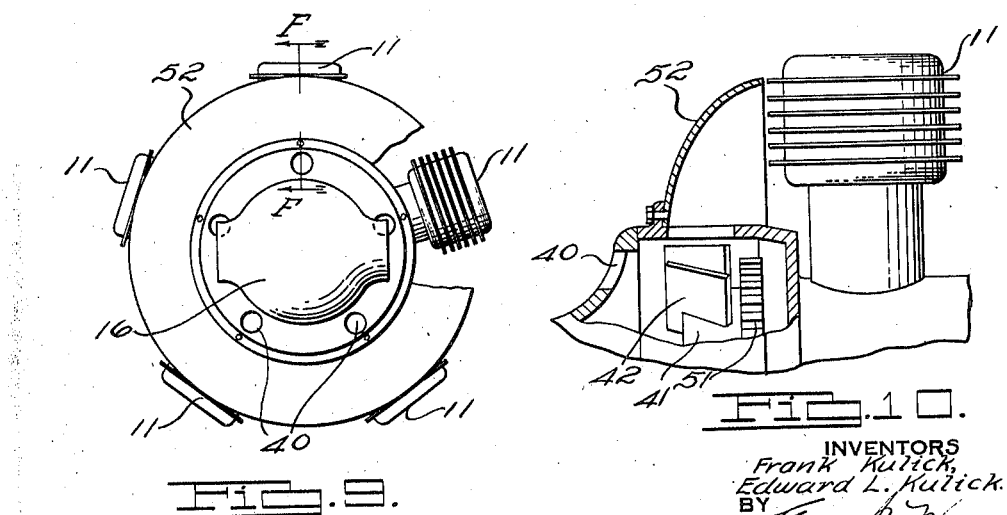
INVENTORS
Frank Kulick,
Edward L. Kulick.
BY
ATTORNEY

Patented May 14, 1935

2,001,029

UNITED STATES PATENT OFFICE 2,001,029

ENGINE SUPPORT FOR AUTOMOBILES

Frank Kulick, Detroit, and Edward L. Kulick, Dearborn, Mich.

Application December 9, 1931, Serial No. 579,946
Renewed March 21, 1935

3 Claims. (Cl. 180—64)

This invention relates to automobiles and the object of the invention is to provide an engine mounting and drive in which the engine is supported at one end on the automobile axle housing and is supported at the opposite end on the automobile chassis.

One of the particular objects of the invention is to provide an extremely flexible engine mounting in which the engine forms a connection between the chassis and axle and is arranged so that the axle and chassis may move in any direction in relation to each other without disturbing the engine mounting.

Another object of the invention is to provide an arrangement whereby the weight of the engine is distributed between the axle and chassis and in which the connection to the chassis is yieldable and allows free action of the chassis on the chassis supporting springs.

Another object of the invention is to provide an engine mounting in which the chassis is provided with a pivoted transverse frame member on which one end of the engine is supported, the connection between the engine and said frame member being yieldable to act as a cushion support for the engine.

These objects and the several novel features of the invention are hereinafter more fully described and claimed and the preferred form of construction by which these objects are attained is shown in the accompanying drawings in which—

Fig. 3 is a view taken on line B—B of Fig. 2.

Fig. 4 is a view taken on line C—C of Fig. 2.

Fig. 5 shows a modified form of engine support.

Fig. 6 is a front elevation of the engine partially broken away to show the blowers.

Fig. 7 is an enlarged section taken on line D—D of Fig. 6.

Fig. 8 is a section taken on line E—E of Fig. 6.

Fig. 9 is an elevation of the engine showing an alternative form of blower housing.

Fig. 10 is an enlarged section taken on line F—F of Fig. 9.

Figure 1:
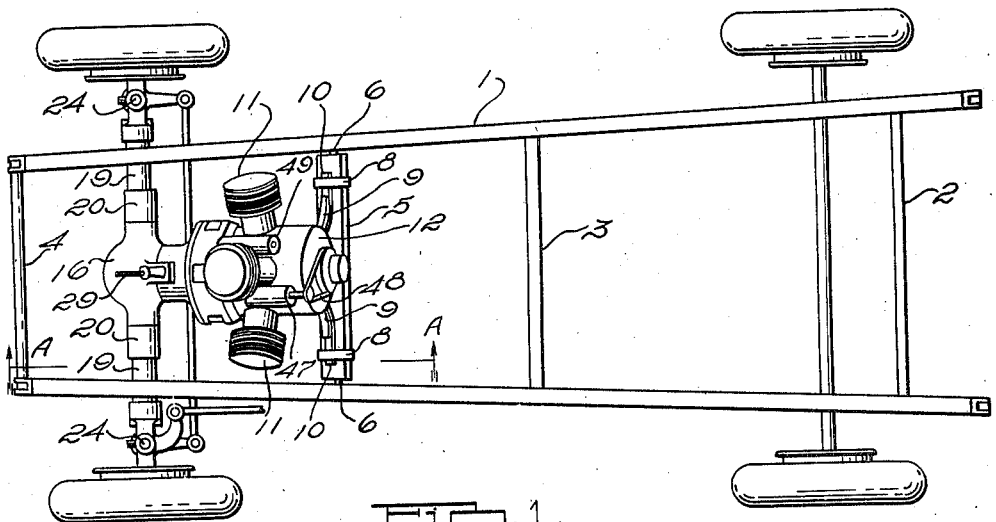
Fig. 1 is a plan view of an automobile chassis showing our improved engine mounting.

In Fig. 1 a conventional chassis frame 1 is shown having the usual cross members 2, 3 and 4. Between the cross members 3 and 4 is a frame member 5. This frame member 5 is provided with trunnions 6 and bearing members 7 are secured in the opposite sides of the chassis frame and provide bearings for the trunnions 6. By this arrangement, the transverse frame member 5 is tiltably mounted in the chassis. A pair of brackets 8 are secured to the frame member 5 and a leaf spring 9 is provided shown in Figs. 1, 2 and 4 having ends 10 extending through the brackets 8 and the ends 10 are slidably mounted on the frame member 5. The engine shown is of the five cylinder radial type having cylinders 11 and a central crank case 12. This crank case is provided with a bracket 13 having a cap member 14 and the leaf spring 9 is secured between the cap and bracket by the machine screw 15 as shown in Fig. 4. By this arrangement, the leaf spring is firmly secured to the crank case 12.

Figure 2:
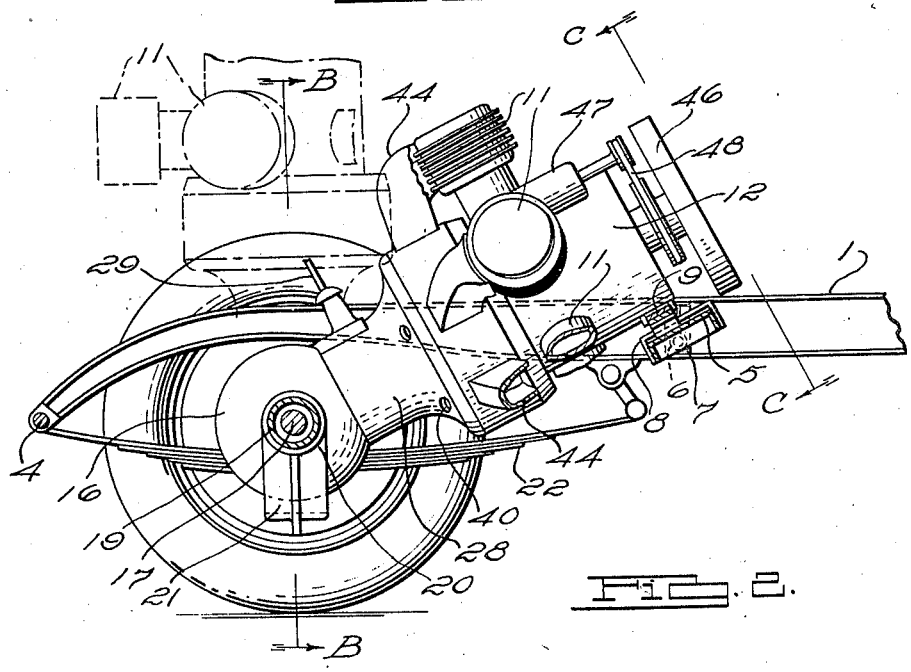
Fig. 2 is an enlarged section taken on line A—A of Fig. 1.

Secured to the engine is the differential housing 16 shown in Figs. 1, 2 and 3 and the crank shaft of the engine extends down into this housing and the housing contains a standard differential not here shown. The differential is arranged to drive the shafts 17 and 18 shown in Fig. 3 and these shafts are each rotatably mounted in a housing 19 shown in the said figure. The ends of the differential housing 16 are rotatably mounted on the ends of the axle housings 19 as will be understood from Fig. 3 and sleeves 20 are welded to the housings 19 and are connected by an integral frame member 21 which forms a support for the inner ends of the axle housings 19. By this arrangement, the engine is rotatably mounted on the axle housings so that it may be free to move up and down on the leaf spring 9 when road shocks are imparted to the engine. The movement of the engine under road shock is usually a short oscillating movement as will be readily understood. In riding over a rough road where a shock is imparted to the wheels, the chassis frame will move down in relation to the axle as will be understood from Fig. 2 and this downward movement of the chassis frame is absorbed by the chassis supporting springs 22 and in this movement the frame member 5 may tilt on its trunnions to absorb the slight tilting movement of the leaf spring 9 under this action. By this arrangement, the engine movement is absorbed by the leaf spring and the chassis movement is compensated by the springs 22 and by the slight turning action of the frame member 5 so that no strain is thrown on the engine.

When the engine support is used in conjunction with a front wheel drive, brackets 23 are secured to the ends of the housings 19 and these brackets are pivotally connected at 24 to the brackets 25 which are secured to the wheels as shown in Fig. 3. By this arrangement, the wheels may be turned on the pivots 24 by means of a standard steering construction shown in Fig. 1. When used in conjunction with a front wheel drive, the axles 17 and 18 are connected to universal joints 26 provided between the wheel pivots 24 and the drive is carried through the shafts 27 to the wheels. The connecting member 21 for the two sleeves 20 is T-shaped in cross section as will be understood from Fig. 2 and firmly supports the inner ends of the housings 19 on opposite sides of the differential housing 16 so that the engine may turn on these housings. This method of mounting the engine provides maximum flexibility between the engine, axle and chassis and allows free movement of the parts relative to each other and by carrying the spring ends 10 beneath the brackets 8 as shown in Fig. 4 the chassis may move sideways to a slight extent in relation to the engine, and, tilting movement of the axle, as will be understood from Figs. 3 and 4, will also be taken up in the spring 9. A gear shift transmission may be provided in the portion 28 of the engine housing, as shown in Fig. 2 and may be provided with a gear shift lever 29 which may be utilized for shifting the gears. This shift lever may be connected by other levers if desired so that the shifting mechanism may be controlled from within an automobile body mounted on the chassis.

An alternative form of engine support is shown in Fig. 5. In this construction a member 30 is secured to the bracket 13 on the crank case 12 and is provided with a cup shaped portion 31. A hollow ball member 32 is inserted in the cup 31 and a ring 33 is secured to the cup 31 to retain the ball 32 therein. A pivot pin 34 is secured to the transverse drop frame member 35, which replaces the member 5 in this case, and this frame member 35 extends below the chassis and is firmly secured to the chassis by the rivets 36. A spring 37 is provided about the pivot pin 34 between the lower end of the member 32 and the frame member 35 and a spring 38 is provided within the ball 32 and engages against a collar 39 secured to the upper end of the pivot pin 34. By this arrangement, downward movement of the engine is absorbed by the spring 37 while upward movement thereof compresses the spring 38 which checks said upward movement. At the same time, the ball may turn in any direction in its cup to take up pivoting or twisting movements of the engine in relation to the chassis or axle.

As shown in Figs. 6 and 8 the housing portion 28 is provided with air inlet apertures 40 and the flywheel 41 is provided with blower vanes 42 as shown in the said figures. The housing portion 43 is provided with an exhaust duct 44 for each cylinder and this duct as shown in Fig. 7 is provided with side portions 45 adapted to direct air through the fins of the cylinders 11. In operation, the air is drawn inwardly through the openings 40 and is blown outwardly by the vanes 42 through the ducts 44 and through the fins of the cylinders 11 to cool the cylinders.

To assist in this movement of air, a fan 46 is secured to the engine crank shaft at the end of the motor and tends to draw the air over the crank case and through the cylinder fins to assist in cooling the motor. In other words, the motor is mounted in an artificially produced air stream which is sufficient to cool the motor even under adverse conditions. The generator 47 may be driven from the crank shaft by a belt 48 in the usual manner and the starting motor 49 is provided with a pinion 50 which may be thrown into mesh with the gear 51 on the flywheel. This is standard construction and the details of the mechanism are not herein described. An alternative form of blower mechanism is shown in Figs. 9 and 10 in which an annular housing 52 is provided through which the air is blown from the blower vanes 42 and this form of housing, of course, blows air between the cylinders as well as around each cylinder and is used in conjunction with the fan 46 which assists in providing air flow.

While we have shown the engine as mounted on the front axle the engine support may be utilized with equal efficiency in mounting the engine on the rear axle in which case the axle shafts 17 and 18 would be connected direct to the rear wheels instead of through the universal joints 26 and housing pivots 24 shown in Fig. 3.

Due to the fact that the differential housing 16 is rotatably mounted on the axle housings 19, the upper end of the engine may be disconnected from its transverse frame member and may be turned up to the position shown in dotted lines in Fig. 2 or may be turned over against the transverse frame member 4 to allow access to all sides of the engine for adjustment, replacement or repair.

The rotation of the movable engine parts will produce a certain amount of torque strain on the chassis and axle but this strain is completely absorbed in the balloon tire toward which the strain is applied.

From the foregoing description, it becomes evident that the device is very simple and efficient in operation, will compensate for all relative movements of the axle, engine and chassis, prevents any strain from being placed on the engine and provides a device which accomplishes the objects described.

Having thus fully described our invention, its utility and mode of operation, what we claim and desire to secure by Letters Patent of the United States is—

1. In a device of the character described, a pair of axle housings, an axle rotatably mounted in each housing, a yoke connecting the two axle housings and arranged to maintain the axle housings in fixed relation, a differential housing pivotally mounted on the axle housings between the ends of the yoke, an engine secured to the differential housing, a chassis, springs secured to the axle housings and yieldably supporting the chassis thereon, a transverse frame member pivotally mounted in the chassis and yieldable means on the transverse frame member supporting the end of the engine opposite the differential housing.

2. In a device of the character described, a pair of axle housings, an axle rotatably mounted in each housing, a wheel driven by each axle, a yoke connecting the two axle housings, a differential housing rotatably mounted on the axle housings between the ends of the yoke, an engine secured to the differential housing, a chassis yieldably mounted on the axle housings, a transverse frame member in the chassis and yieldable means supporting the engine on the transverse frame member.

3. In an engine support for automobiles, an axle, an engine pivotally supported at one end on the axle, a chassis yieldably supported on the axle, a transverse frame member having trunnions at each end, a support secured in each side of the chassis to receive the trunnions of the transverse frame member and yieldable means connecting the transverse frame member and engine, said yieldable means allowing relative movement of the engine in all directions in relation to the transverse frame member.

FRANK KULICK.
EDWARD L. KULICK.